H. G. RUSSELL.
Car-Couplings.
No. 144,479.  Patented Nov. 11, 1873.
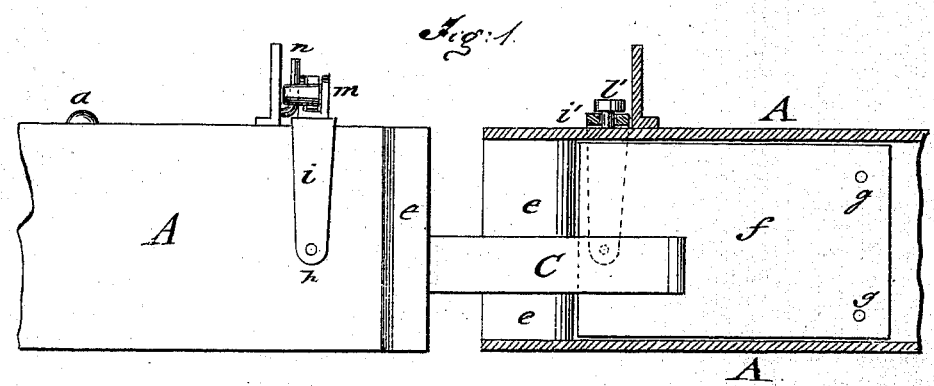
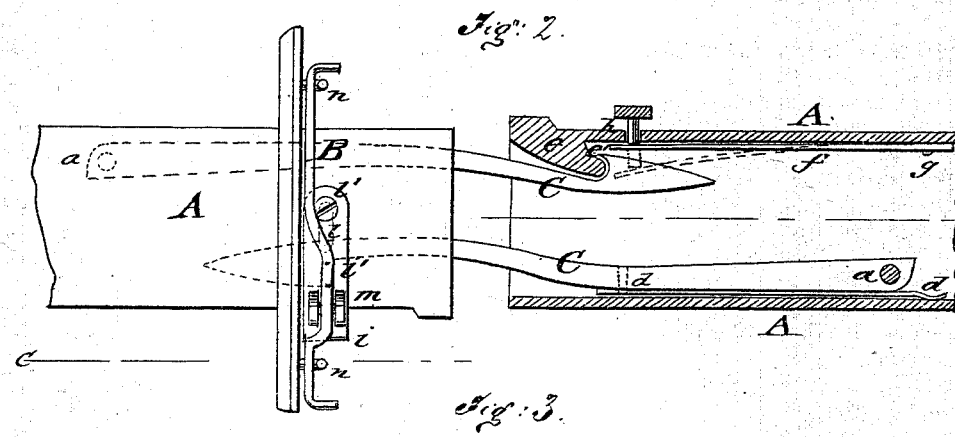
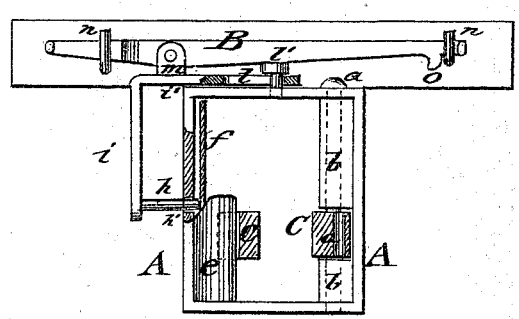
Witnesses:
Chas. Nida
D. Sedgwick
Inventor:
H. G. Russell
Per  _____
Attorneys.

UNITED STATES PATENT OFFICE.

HAMLIN G. RUSSELL, OF LINCOLN, ILLINOIS.

IMPROVEMENT IN CAR-COUPLINGS.

Specification forming part of Letters Patent No. 144,479, dated November 11, 1873; application filed June 14, 1873.

*To all whom it may concern:*

Be it known that I, HAMLIN G. RUSSELL, of Lincoln, in the county of Logan and State of Illinois, have invented a new and Improved Car-Coupling, of which the following is a specification:

In the accompanying drawing, Figure 1 represents a sectional side view of my improved car-coupling on the line *c c*, Fig. 2; Fig. 2, a top view of the same, partly in section; and Fig. 3, an end view of the same, partly in section.

Similar letters of reference indicate corresponding parts.

The object of my invention is to provide an improved automatical car-coupling, which couples easily and quickly, and is applicable to cars of different heights. It is also arranged so that trains may be made up and the cars be brought together without coupling. My invention consists of draw-bars with pivoted spring-hooks, which engage with recessed parts and connect with a disengaging mechanism for uncoupling, which also prevents the hooks from coupling on making up the train.

In the drawing, A A represent the draw-bars, of oblong shape, attached to the lower sides of the car-platforms. Each bar is provided with a coupling-hook, C, which is pivoted, at the rear end of the same, to a strong vertical rod, *a*. Projecting parts *b* of draw-bar A secure the even lateral working of hook C. A strong band-spring, *d*, is connected to hook C and placed in such a manner between it and the side of draw-bar A that the force of the same presses hook C toward that side of the draw-bar. The opposite side of draw-bar A is made with a solid inclined part, *e*, at the mouth, for the easy entering of the coupling-hook of the adjoining-car. Part *e* is supplied with a vertical groove *e'*, along its rear edge, into which the hook C locks. A catch-plate, *f*, is secured to the side of draw-bar A in the rear of part *e*, by bolts, screws, or rivets *g*, so that its front part has an elastic spring-like action. A bolt or pin, *h*, which passes through a hole, *h'*, of draw-bar A, is rigidly applied to bar *i*, which slides, by its rectangular leg *i'*, on the top of draw-bar A, by means of slot *l* and lug *l'*. Leg *i'* carries the fulcrum *m* of lever B, which engages hooks *n* of platform at both sides of fulcrum *m*. Both ends of lever B are bent forward to be arrested by hooks *n* in the sliding sideward motion of bars *i i'*. A hook-shaped projection, *o*, of the longer end of lever B may be locked on hook *n*, and thereby the catch-plate *f* retained by bolt *h* in its forward-extending position, preventing thereby the engaging of hook C. A suitable treadle or other mechanism is applied to the shorter end of lever B for adjusting the catch-plate for coupling or uncoupling.

On the approaching of the cars, the hooks C lock into the grooves *e'* of parts *e*. For uncoupling, lever B is carried sidewise, so that the catch-plates *f* act on the ends of hooks C and disengage them from grooves *e'*. The play in vertical direction which is given to hooks C along parts *e* allows the coupling of cars of different heights, while the side play of the hooks disconnects instantly the cars when any one should get off the track.

Having thus described my invention, I claim as new and desire to secure by Letters Patent—

1. The car-coupling, consisting of draw-bar A, spring-hook C, catch-plate *f*, lever B, and sliding bars *i i'*, all combined and constructed substantially as and for the purpose described.

2. The draw-bar, provided with the projections *b* to co-operate with the coupling-hooks C, as and for the purpose specified.

3. The combination of the slotted angle-bars *i i'*, having fulcrum-lug *m*, the stud or pin *h*, and lever or bar B, as shown and described.

4. In a car-coupling, the lever B, having lugs *o* and bent ends, in combination with the hooks *n*, as shown and described, for the purpose specified.

HAMLIN G. RUSSELL.

Witnesses:
JAMES T. HOBLIT,
WILLIAM TOOMEY.